(12) United States Patent
Bray et al.

(10) Patent No.: US 12,606,385 B1
(45) Date of Patent: Apr. 21, 2026

(54) AUTOMATED REORIENTATION OF SORTATION SHUTTLES

(71) Applicant: Amazon Technologies, Inc., Seattle, WA (US)

(72) Inventors: Michael Alan Bray, Elkhorn, NE (US); Ganesh Krishnamoorthy, Seattle, WA (US); Daniel Lais, Mill Creek, WA (US)

(73) Assignee: Amazon Technologies, Inc., Seattle, WA (US)

( * ) Notice: Subject to any disclaimer, the term of this patent is extended or adjusted under 35 U.S.C. 154(b) by 932 days.

(21) Appl. No.: 17/880,171

(22) Filed: Aug. 3, 2022

(51) Int. Cl.
| | |
|---|---|
| *B65G 47/244* | (2006.01) |
| *B60L 13/00* | (2006.01) |
| *B60L 13/03* | (2006.01) |
| *B61J 1/04* | (2006.01) |
| *B65G 47/22* | (2006.01) |
| *B65G 47/24* | (2006.01) |
| *B65G 47/248* | (2006.01) |
| *B65G 47/252* | (2006.01) |
| *B65G 54/02* | (2006.01) |

(Continued)

(52) U.S. Cl.
CPC ............ *B65G 47/244* (2013.01); *B60L 13/00* (2013.01); *B60L 13/003* (2013.01); *B60L 13/03* (2013.01); *B60L 13/035* (2013.01); *B61J 1/04* (2013.01); *B65G 47/22* (2013.01); *B65G 47/24* (2013.01); *B65G 47/248* (2013.01); *B65G 47/252* (2013.01); *B65G 54/02* (2013.01); *B61J 1/10* (2013.01); *B61J 1/12* (2013.01)

(58) Field of Classification Search
CPC .... B61J 1/00–12; B65G 47/244; B65G 47/22; B65G 47/24; B65G 47/248; B65G 47/252; B65G 54/02; B60L 13/00; B60L 13/003; B60L 13/03; B60L 13/035
USPC ............................................ 104/38, 290–294
See application file for complete search history.

(56) References Cited

U.S. PATENT DOCUMENTS

| | | | | | |
|---|---|---|---|---|---|
| 3,874,299 | A | * | 4/1975 | Silva ..................... | B60L 13/003 |
| | | | | | 104/130.02 |
| 3,964,398 | A | * | 6/1976 | Breitling ............... | B60L 13/003 |
| | | | | | 104/130.02 |

(Continued)

FOREIGN PATENT DOCUMENTS

| | | | | | |
|---|---|---|---|---|---|
| CN | 107106913 | A | * | 8/2017 | ........... H02K 41/025 |
| CN | 108284770 | A | * | 7/2018 | .............. B60L 13/10 |

(Continued)

*Primary Examiner* — S. Joseph Morano
*Assistant Examiner* — James William Jones
(74) *Attorney, Agent, or Firm* — Eversheds Sutherland (US) LLP

(57) ABSTRACT

Systems and methods are disclosed for automated reorientation of sortation shuttles. An example system for automated shuttle reorientation may include a track having a first portion, a second portion, and a rotatable portion that a first end and a second end, where the rotatable portion is configured to rotate from a first position to a second position, and where the first end is adjacent to the first portion of the track in the first position, and the first end is adjacent to the second portion of the track in the second position. The system may include a shuttle configured to move along the track, where the rotatable portion of the track is configured to rotate the shuttle from a first orientation to a second orientation.

18 Claims, 11 Drawing Sheets

(51) Int. Cl.
    *B61J 1/10*        (2006.01)
    *B61J 1/12*        (2006.01)

(56)           References Cited

U.S. PATENT DOCUMENTS

| | | | | |
|---|---|---|---|---|
| 4,312,276 | A | * | 1/1982 | Cory ........................... B61J 1/02 |
| | | | | 104/38 |
| 6,095,054 | A | * | 8/2000 | Kawano ................... B61B 13/04 |
| | | | | 104/140 |
| 2018/0075506 | A1 | * | 3/2018 | Burkhard ................... B65B 7/00 |
| 2019/0184430 | A1 | * | 6/2019 | Fumagalli ................. B07C 5/36 |
| 2022/0250483 | A1 | * | 8/2022 | King ........................ B60L 13/10 |

FOREIGN PATENT DOCUMENTS

| | | | | | |
|---|---|---|---|---|---|
| DE | 102005047530 | A1 | * | 4/2007 | ............. B65G 13/10 |
| DE | 202008016678 | U1 | * | 3/2009 | ................ B61J 1/02 |
| DE | 102013105896 | A1 | * | 12/2014 | ....... H01L 21/67709 |
| KR | 100615551 | B1 | * | 8/2006 | ............. B65G 49/00 |
| KR | 20210138397 | A | * | 11/2021 | ............. B65G 47/74 |
| WO | WO-9950122 | A1 | * | 10/1999 | ............. F21V 21/34 |
| WO | WO-0034100 | A1 | * | 6/2000 | ................ B61J 1/08 |
| WO | WO-2019171456 | A1 | * | 9/2019 | ............. B60L 13/03 |

* cited by examiner

CROSS-SECTIONAL VIEW A

AUTOMATED REORIENTATION OF SORTATION SHUTTLES

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, transport technology, packing technology, and so forth may be desired, such that manual efforts can be redirected to different tasks.

Figure 1:
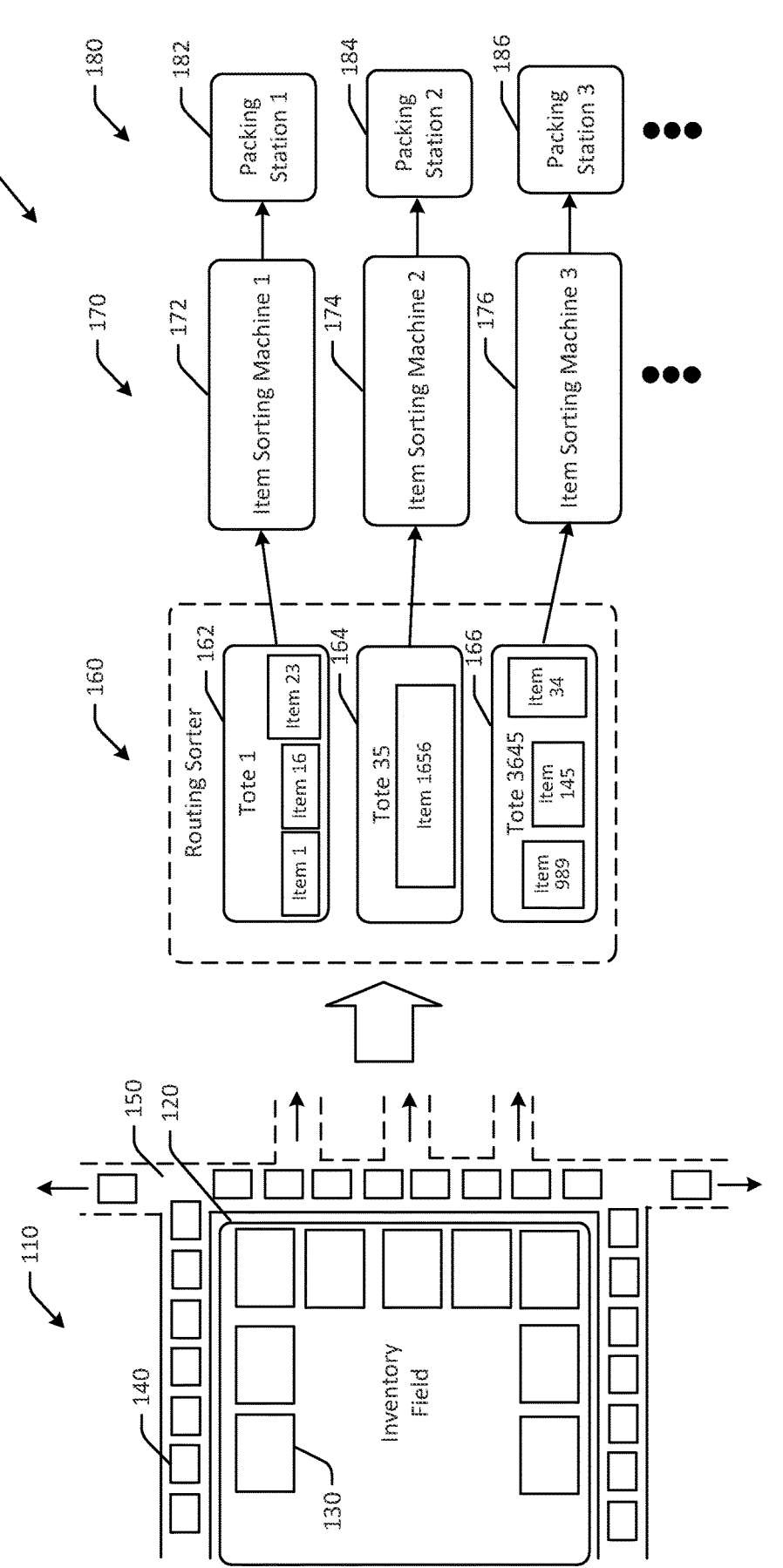
FIG. 1 is a hybrid schematic illustration of an example use case for automated reorientation of sortation shuttles in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. Humans may be able to manually handle individual items with ease. However, robotic handling of individual items may require various levels of dexterity. Moreover, fulfillment centers may include lengthy conveyors that may be used to transport objects, such as packages, products, items, or other objects, as well as containers that may be at least partially full of objects. Transport of containers or items (e.g., individual items or multiple items, etc.) may involve the use of container shuttles that move on one or more rails to transport a container from one location to another. For example, a container of items may be loaded onto a shuttle, and the shuttle may transport the container from an inventory field to a sortation system or other location. Shuttles may be used to transport containers and/or one or more items from a first location to a second location.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle.

Container shuttles may be in continuous operation and may move at relatively high speeds, such as speeds of three meters per second or more. As a result, container shuttles may require scheduled or unscheduled maintenance from time to time. For example, container shuttles may require preventative maintenance at scheduled intervals, such as calibration of one or more components, or may require unscheduled maintenance in the event of a breakdown, etc. In instances where a container shuttle breaks down or experiences a malfunction that causes the shuttle to be unable to move, backups and traffic jams may occur due to the serial nature of shuttle rail tracks.

Accordingly, for various reasons, including maintenance, sortation shuttles may be removed from a shuttle rail track and then later reintroduced. During such reintroduction, a shuttle orientation may be reversed, which may impact downstream processes. For example, a shuttle may be configured to convey items in two directions using a bi-directional conveyance assembly. However, if the shuttle orientation is reversed, the shuttle may convey items or containers in an opposite direction than intended. In addition, if the shuttle has a wireless power receiver or other component that is positioned on a certain side of the shuttle, the component may not be in the correct position when the shuttle is in the wrong orientation, and may therefore not function properly.

To address such instances without having to remove the shuttle from the shuttle rail track and causing additional downtime, embodiments of the disclosure include systems and methods for automated reorientation of sortation shuttles. Embodiments include tracks having dynamic turn-table-style rotatable portions that allow for rapid reorientation of sortation shuttles. Some tracks may include more than one rotatable portion, such as rotatable portions positioned at or before an induction portion of the sortation system, at or before a packing system accessible by the shuttle rail system, at or before entering a sortation system, and/or other locations. The automated reorientation systems may include one or more electromagnets configured to rotate with a portion of the track, where the electromagnet(s) can be energized to secure the shuttle in place during rotation. After rotation, the shuttle may continue moving downstream along the track. The rotatable portion of the track may be configured to rotate both in a clockwise direction and counter-clockwise direction, and may alternate rotating in each direction, such that the rotatable portion goes back and forth rotating in a clockwise direction and then a counter-clockwise direction so as to avoid rotating a complete 360 degrees.

Embodiments may therefore automatically reverse shuttle orientation without having to remove shuttles from the shuttle rail system. For instance, certain shuttles may include one or more magnets, such as permanent magnets, under-neath the shuttle that interact with electromagnets disposed along a set of rails. The permanent magnet and electromag-nets may work together to form a linear induction motor that propels the shuttle. Because the shuttles may be propelled via electromagnetic propulsion, the shuttle may be secured during rotation using a rotatable electromagnet coupled to the rotatable portion of the track.

As a result of the improve functionality provided by the automated shuttle reorientation systems and methods described herein, flexibility of the processing of items at the fulfillment center may be increased, such as by providing the ability to reorient shuttles without any, or with limited, manual intervention. Some embodiments include optimized process flows for processing of orders at fulfillment centers, as well as process flows or methods to increase speed of consolidating products in a multi-item order as a result of improved speed in transportation of items and/or containers. As a result, throughput of fulfillment centers may be improved, and/or logistics of fulfillment center operations may be less complicated.

Referring to FIG. 1, an example use case 100 for auto-mated reorientation of sortation shuttles is depicted in accor-dance with one or more embodiments of the disclosure. Although discussed in the context of online orders, other embodiments may be directed to any suitable use case where containers or items are transported, such as instances where objects are picked from inventory, placed into containers, containers are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configu-ration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclo-sure may not include some or all of the conveyors 150, and instead may include rails that may be used to guide shuttles from one location to another. The rails may be used with automated reorientation systems for shuttles described herein.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of containers is used and/or shuttles are used to transport items or containers between systems, systems as described herein may be used for automated reorientation of sortation shuttles.

Embodiments of the disclosure include systems and methods for automated reorientation of sortation shuttles. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 2:
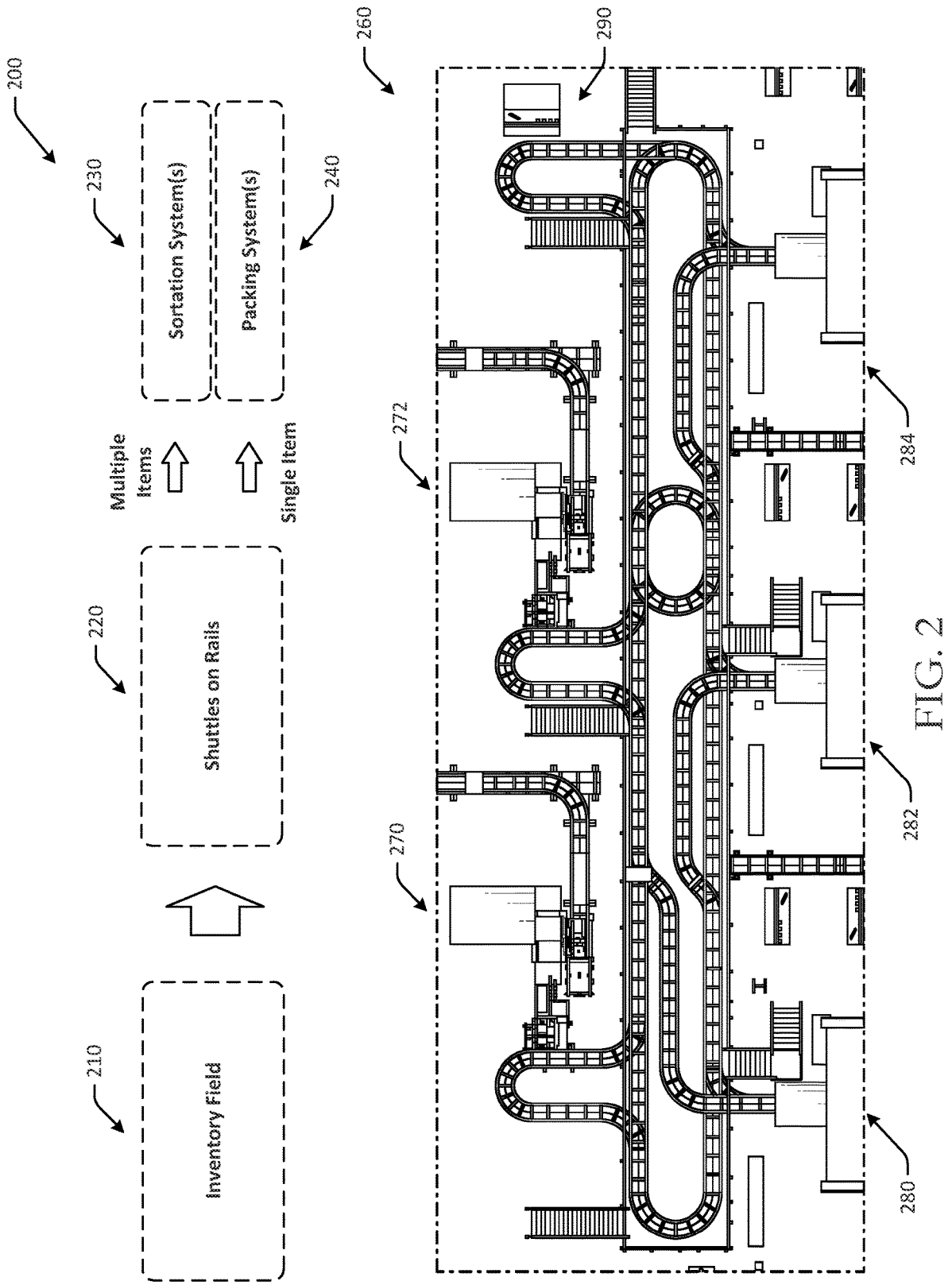
FIG. 2 is a schematic illustration of an example use case and facility layout for automated reorientation of sortation shuttles in accordance with one or more embodiments of the disclosure.

FIG. 2 is a schematic illustration of an example use case 200 and facility layout for automated reorientation of sortation shuttles in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using robots, vehicles, or a combination thereof.

The picked products may be placed into one or more containers and the containers may be transported using one or more shuttles, such as one or more shuttles on rails 220. The shuttles on rails 220 may include container shuttles that are configured to transport items and/or containers from one location to another via rails. The rails may include switching rail components that allow for the shuttles to move from one set of rails to another. The shuttles on rails 220 may transport containers from the inventory field 210 to one or more downstream processes, such as a sortation system 230, or a packing system 240. For example, the sortation system 230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. The rail system 260 is an example of a network of rails that may be used by shuttles to transport containers from one location to another. The network of rails may include locations at which a shuttle can be directed to a straight path or to a loop, turn, oval, circle, and/or other geometries that involve a change in direction of a shuttle on the rails. Such changes in direction may be implemented using switching rail components. Shuttles can be routed to a maintenance area 290 connected to the rail system 260 using the systems described herein. The rail system 260 may include rails that link various systems, such as sortation systems, to each other and/or to other systems, such as container handling systems, manual induction systems 290, and so forth. For example, the rail system 260 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motors or other drive components. Some drive components may provide a drive force via electromagnetism. As a result, one or more electromagnets may be disposed along the network of rails. Shuttles may optionally include a conveyor belt that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off of the conveyor belt. The shuttles may include an on-board drive motor configured to move the conveyor belt in a forward direction and/or a reverse direction. The shuttles may include a magnet disposed on a lower surface of the shuttle. The magnet may be used to propel and/or secure the shuttle. For example, the magnet may prevent the shuttle from moving while the vehicle is in motion and the linear drive motor is engaged. To onboard or offload containers, the linear drive motor of the shuttle or other component may be used in conjunction with the magnet to impart motion. The automated shuttle reorientation systems described herein may be positioned at one or more locations along the rail system 260.

Figure 3:
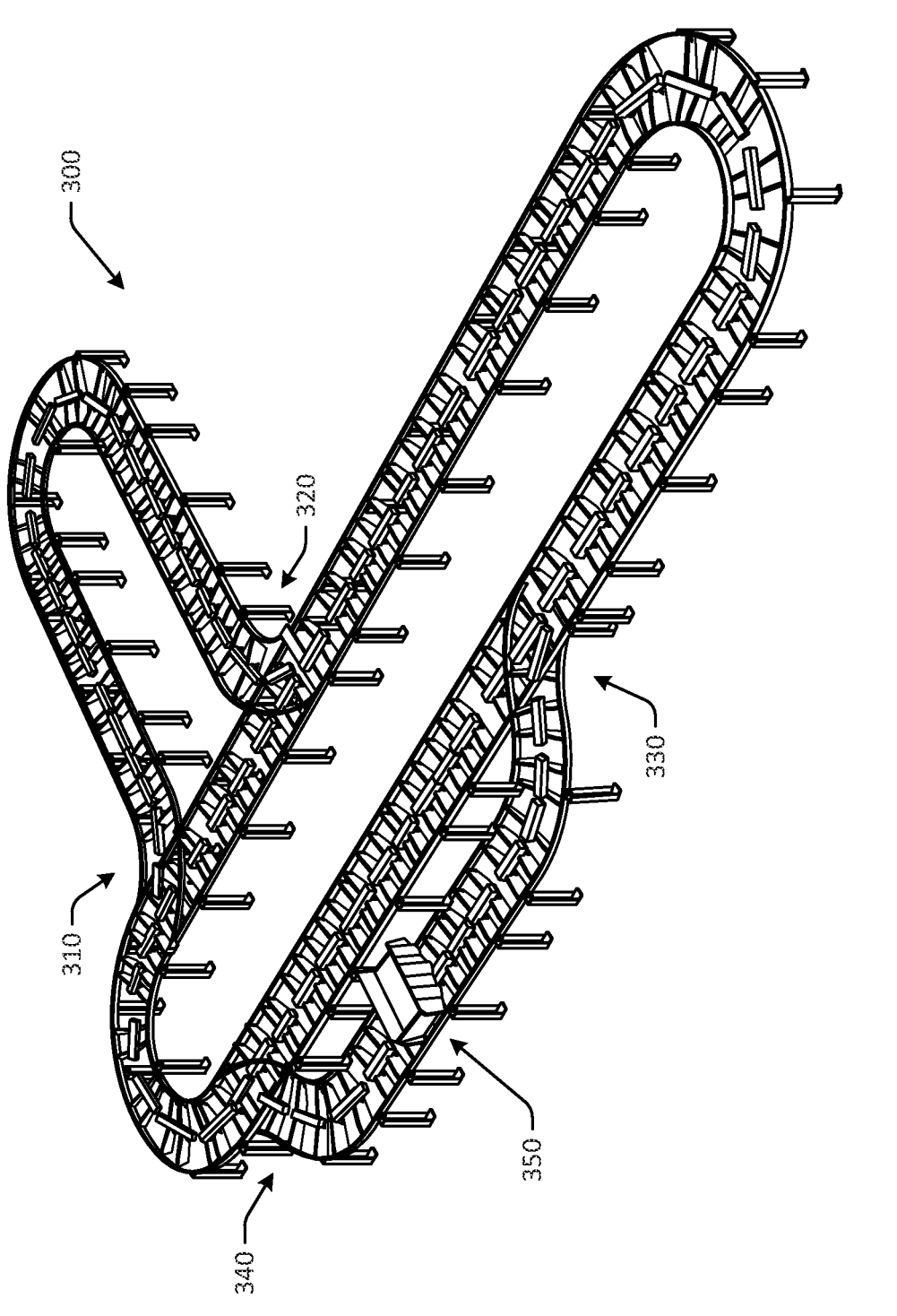
FIG. 3 is a schematic illustration of a perspective view of a shuttle rail system in accordance with one or more embodiments of the disclosure.

FIG. 3 is a schematic illustration of a perspective view of a shuttle rail system 300 in accordance with one or more embodiments of the disclosure. Other embodiments may include additional or fewer components. The illustration of FIG. 3 is not to scale, and may not be illustrated to scale with respect to other figures. The system illustrated in FIG. 3 may be used with the automated reorientation systems for shuttles discussed with respect to FIGS. 1-2, and/or may be used with any of the systems described herein.

The shuttle rail system 300 may be configured to provide continuous rail for switching the direction of a shuttle 350 in an electromagnetically propelled shuttle-on-rail arrangement. Shuttle-on-rail arrangements may be used in many systems, such as sortation systems, pick systems, delivery systems, etc. The shuttle rail system 300 may include rail switch mechanisms to allow the rail to be directed to alternate path. Shuttle-rail arrangements that are based on electromagnetic propulsion, such as linear drive motors, may have sets of electromagnets arranged along the direction of the rails. Shuttles may also have a magnet, such as a permanent magnet, coupled to a lower side of the shuttle. The electromagnet and the permanent magnet may have to be separated by a very narrow gap for optimal performance. Such factors may make removal of the shuttle 350 from the shuttle rail system 300 difficult, due to potential unintended interaction between the magnets. Embodiments of the disclosure include systems that allow for reorientation of shuttles without having to fully remove shuttles from the rails.

The shuttle rail system 300 may include a first branched path 310, where if shuttles were moving along the shuttle rail system 300 in a clockwise direction, the shuttle could move in either a straight direction along the oval path of the shuttle rail system 300, or may make a left-handed curve onto a separate path of the shuttle rail system 300. Similarly, a second branched path 320 may allow for merging of shuttles that took a left curve at the first branched path 310 to merge back onto the oval path of the shuttle rail system 300. Any number of curved path and straight path intersections may be included in the shuttle rail system 300. For example, the shuttle rail system 300 may include a third branched path 330 and a fourth branched path 340. The shuttle rail system 300 may form a closed loop track in some embodiments.

A maintenance area may be connected to the shuttle rail system 300 and may be accessible via the shuttle rail system 300. For example, the shuttle 350 moving along the shuttle rail system 300 may direct itself autonomously to the maintenance area by following a branched path, such as that illustrated in FIGS. 7A-7B (e.g., where the shuttle 350 is depicted in FIG. 3), where the branched path may provide ingress and egress to a main path of the shuttle rail system 300.

Figure 4:
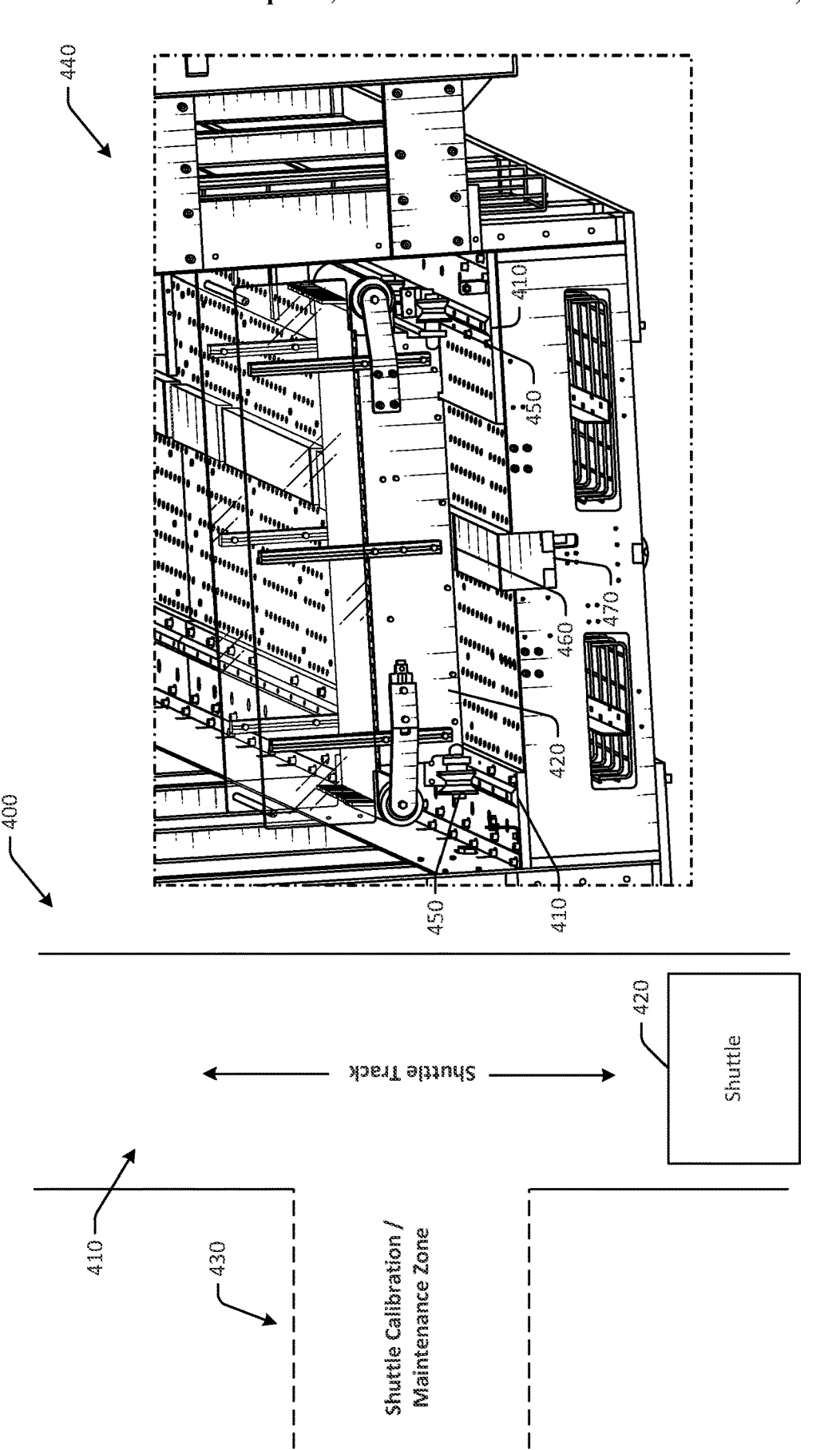
FIG. 4 is a schematic illustration of various views of portions of a shuttle rail system in accordance with one or more example embodiments of the disclosure.

FIG. 4 is a schematic illustration of various views of portions of a shuttle rail system 400 in accordance with one or more example embodiments of the disclosure. Other embodiments may include additional or fewer components. The illustration of FIG. 4 is not to scale, and may not be illustrated to scale with respect to other figures. The system illustrated in FIG. 4 may include the same shuttle and shuttle rail system discussed with respect to FIGS. 1-3.

FIG. 4 depicts a portion of the shuttle rail system 400 in a top schematic view. The shuttle rail system 400 may include one or more sets of rails 410 on which shuttles 420 may ride. The rails 410 may guide shuttles 420 to various locations. Each set of rails 410 may include two rails, so as to support two sides of a shuttle 420 on the rails. The shuttle rail system 400 may include a number of supports disposed between the two rails of a set of rails 410. A number of electromagnets 470 may optionally be disposed along the rails at various intervals. The electromagnets 470 may be configured to propel shuttles along the respective sets of rails.

The shuttle rail system may include a shuttle calibration/maintenance zone 430 that is connected to the shuttle rail system 400 and is accessible via the tracks. For example, a shuttle may seamlessly move from the set of rails 410 to the shuttle calibration/maintenance zone 430. The shuttle calibration/maintenance zone 430 may be a section of shuttle track that leads to a maintenance area at which one or more robotic manipulators are disposed. The shuttle calibration/maintenance zone 430 may be accessible as a branched path, a loop, and/or a straight track that can be used for shuttles to move back-and-forth along.

A perspective view 440 in FIG. 4 depicts the shuttle 420 engaged with the shuttle rail system 400. The shuttle 420 may include wheels 450 that engage the rails 410. Some embodiments may include four wheels 450, while other embodiments may include different numbers of wheels. Any suitable number and size of wheels may be used to engage with the rails 410.

The shuttle 420 may include a permanent magnet 460 disposed underneath the shuttle 420. The permanent magnet 460 may interact with the electromagnets 470 to electromagnetically propel the shuttle 420. The electromagnets 460 may therefore be a linear synchronous motor in some embodiments.

Although the shuttle 420 is depicted as traveling in a sideways configuration with respect to the shuttle rail system 400 (e.g., a payload on the shuttle 420 may be moving sideways with respect to the shuttle rail system 400, etc.), in other embodiments, the shuttle 420 may be oriented differently.

The shuttle rail system 400 may therefore include the set of rails 410 that form a track having a central axis. The set of rails 410 may include a first rail segment on a first side of the central axis and a second rail segment on a second side of the central axis. The shuttle rail system 400 may include the set of electromagnets 470 disposed along the central axis of the track. The shuttle rail system 400 may be used with the shuttles 420, where the shuttles 420 are configured to transport one or more items or containers from a first location to a second location using the set of rails 410. The shuttle may include a first pair of wheels 450 disposed at a front end of the shuttle 420, and a second pair of wheels 450 disposed at a rear end of the shuttle 420. In some embodiments, the shuttle 420 may include a conveyor assembly having a central axis that is transverse to the central axis of the track, such as in the embodiment depicted in FIG. 4. The shuttle 420 may include the permanent magnet 460 coupled to a lower surface of the shuttle 420. The permanent magnet 460 may be configured to engage with the set of electromagnets 470 to propel the shuttle 420.

Figure 5A:
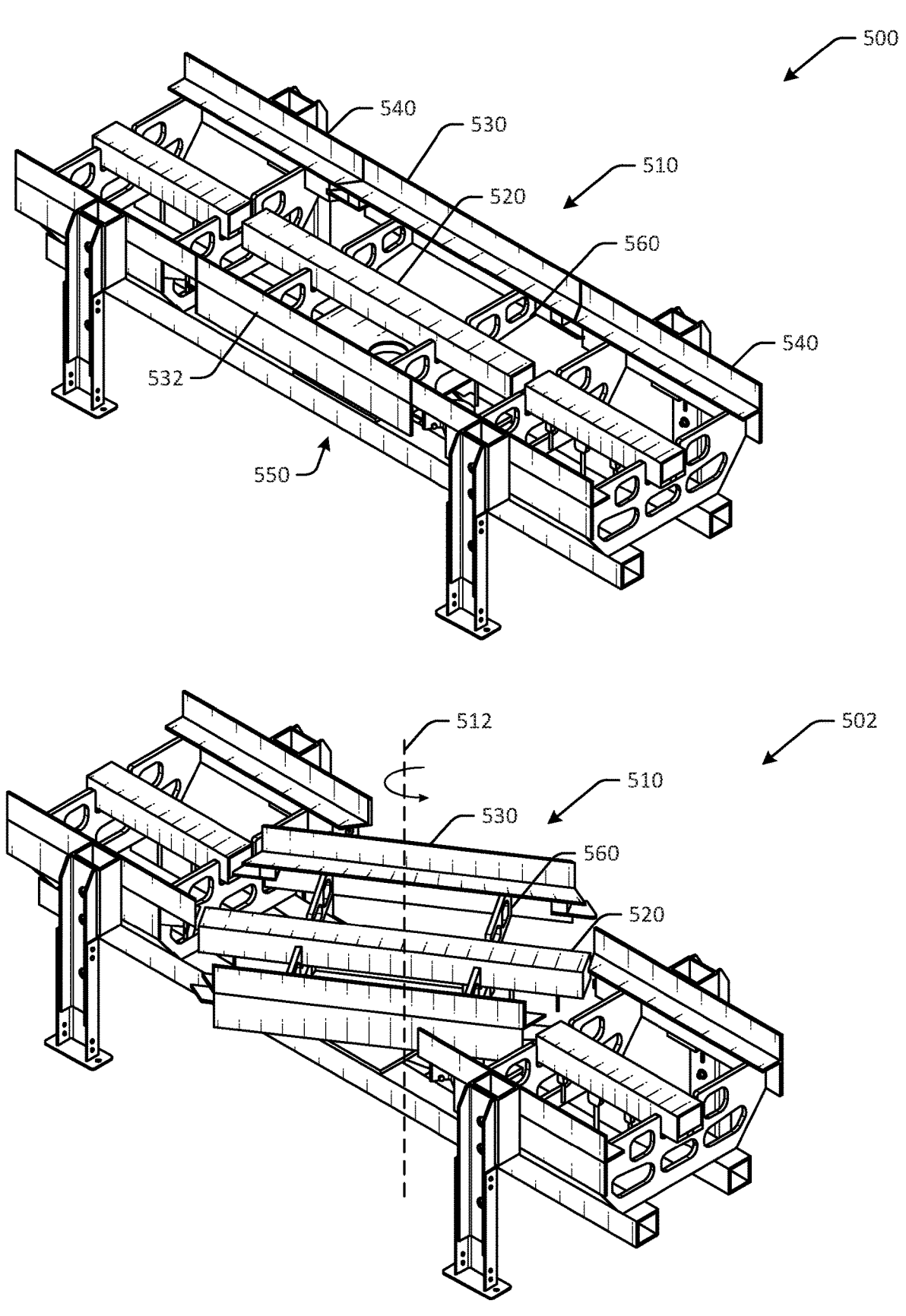
FIGS. 5A-5B are schematic illustrations of a shuttle rail system with an automated shuttle reorientation system in accordance with one or more embodiments of the disclosure.
Figure 5B:
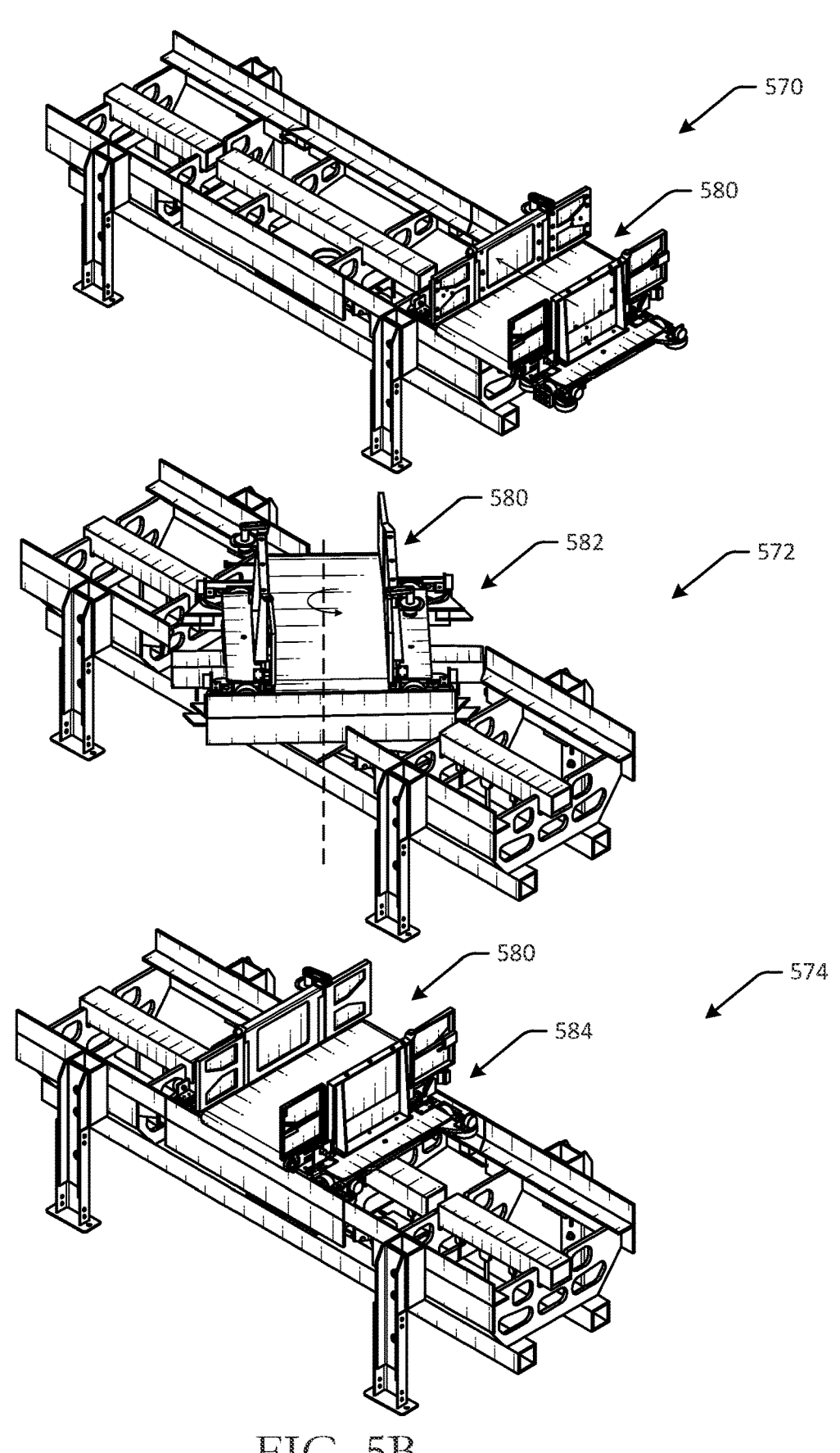

FIGS. 5A-5B are schematic illustrations of a shuttle rail system 500 with an automated shuttle reorientation system in accordance with one or more embodiments of the disclosure. Other embodiments may include additional or fewer components. The illustrations of FIGS. 5A-5B are not to scale, and may not be illustrated to scale with respect to other figures. The automated shuttle reorientation system illustrated in FIGS. 5A-5B may be the same automated shuttle reorientation system discussed with respect to FIGS. 1-4.

In FIG. 5A, the shuttle rail system 500 may have an automated shuttle reorientation system. The shuttle rail system 500 may include a track formed of one or rail segments 540. One or more electromagnets 520 may be disposed along the track. One or more supports 560 may be disposed between parallel rail segments 540 to provide structural support for the shuttle rail system 500.

The automated shuttle reorientation system may include a rotatable portion 510 depicted in static view and in a dynamic view 502 in FIG. 5A. The rotatable portion 510 may be a portion of the track or may be coupled to the track. The rotatable portion 510 may be configured to rotate at least 180 degrees, and in some embodiments, less than 360 degrees. In other embodiments, the rotatable portion 510 may be configured to rotate 360 degrees. The rotatable portion 510 may be configured to rotate in one or more of a clockwise direction, a counter-clockwise direction, or both directions. The rotatable portion 510 may rotate about a vertical axis 512. In some embodiments, the rotatable portion 510 may alternate a direction of rotation, such as first rotating in a clockwise direction, and then rotating in a counter-clockwise direction, then in a clockwise direction, and so forth.

As the rotatable portion 510 rotates, the rotatable portion 510 may include one or more electromagnets 520 that rotate with the rotatable portion 510. The rotatable portion 510 may include one or more supports 560 that rotate with the rotatable portion 510. The rotatable portion 510 may include a first rail segment 530 and a second rail segment 532 that rotate with the rotatable portion 510. The electromagnet 520 may be used to secure a shuttle in position during rotation. For example, the electromagnet 520 may be energized and engage a permanent magnet on a shuttle to prevent the shuttle from moving during rotation. The rotatable portion 510 may include a rotation actuation device 550 configured to cause rotation of the rotatable portion 510, as discussed in more detail with respect to FIGS. 6A-6B.

As depicted in FIG. 5B, the rotatable portion 510 may be configured to rotate a shuttle 580 so as to reverse an orientation of the shuttle. The shuttle rail system 500 may include a first portion (e.g., formed by rail segments 540 at the right side of the page in FIG. 5A, etc.), a second portion (e.g., formed by rail segments 540 at the left side of the page in FIG. 5A, etc.), and the rotatable portion 510. The rotatable portion 510 may include a first end and a second end, where the rotatable portion 510 may be configured to rotate from a first position 570 to a second position 574, and where the first end is adjacent to the first portion of the track in the first position 570, and the first end is adjacent to the second portion of the track in the second position 574. The shuttle rail system 500 may include a shuttle 580 configured to move along the track, where the rotatable portion 510 of the track is configured to rotate the shuttle 580 from a first orientation to a second orientation. The second reorientation may be opposite or a reverse of the first orientation.

In FIG. 5B, the shuttle rail system 500 is depicted with the shuttle 580. The rotatable portion 510 may be configured to rotate the shuttle 580 such that an orientation of the shuttle is modified. In some instances, the orientation of the shuttle 580 may be reversed by the rotatable portion 510. The rotatable portion 510 may be in a first position 570, where a first end of the rotatable portion 510 is adjacent to a first portion of the track. The shuttle 580 may move onto the rotatable portion 510. Once secured on the rotatable portion 510, the rotatable portion 510 may rotate as shown in intermediate view 572 and wherein the electromagnet(s) of the rotatable portion 510 are energized 582 to secure the shuttle 580. The rotatable portion 510 may rotate to the second position 574, where the first end of the rotatable portion 510 is adjacent to a second portion of the track. Once in the second position 574, the electromagnet may be de-energized or energized 584 in a different configuration to propel the shuttle 580 along the track. For example, the shuttle 580 may include one or more permanent magnets, and the rotatable portion 510 may include an electromagnet configured to rotate from the first position to the second portion, where the shuttle 580 can be propelled via interaction between the electromagnet and the permanent magnet.

The track may include a first support, such as the supports 560, having a fixed position at the first portion, and a second support, such as supports 560, configured to rotate with the rotatable portion 510. The rotatable portion may be configured to rotate less than 360 degrees in some embodiments, and at least 360 degrees in other embodiments. Because the track may be a closed loop track, the automated reorientation system may allow for reorientation of shuttles without having to remove the shuttle from the track. The electromagnet 520 may secure the shuttle 580 in position during rotation of the rotatable portion 510. Reversal of shuttle orientation may be represented by conveyance axis, for example, where the shuttle 580 has a conveyor having a first central axis that is transverse to a second central axis of the track.

Figure 6A:
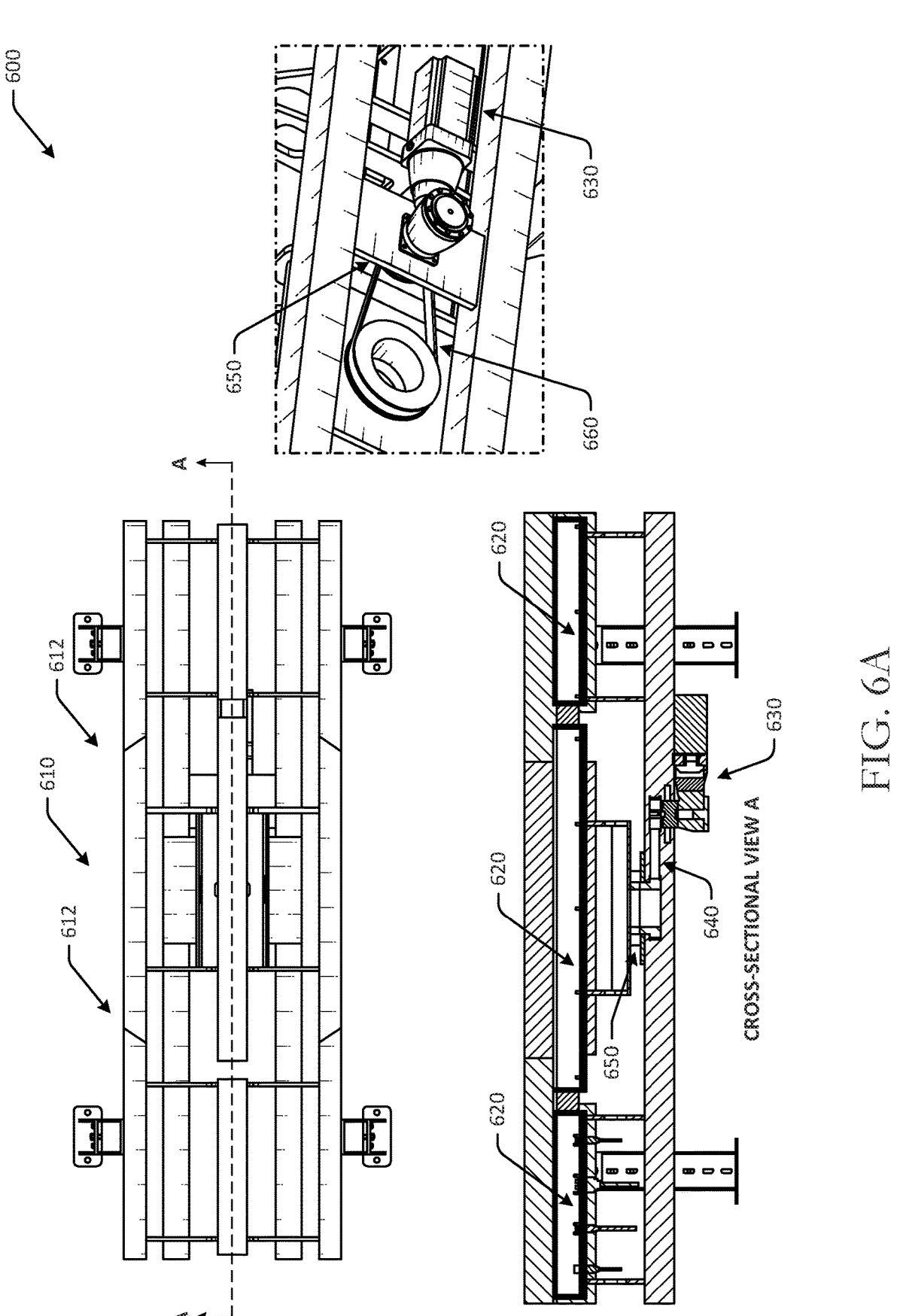
FIGS. 6A-6B are schematic illustrations of an automated shuttle reorientation system in accordance with one or more embodiments of the disclosure.
Figure 6B:
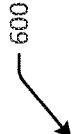
Figure 6B:
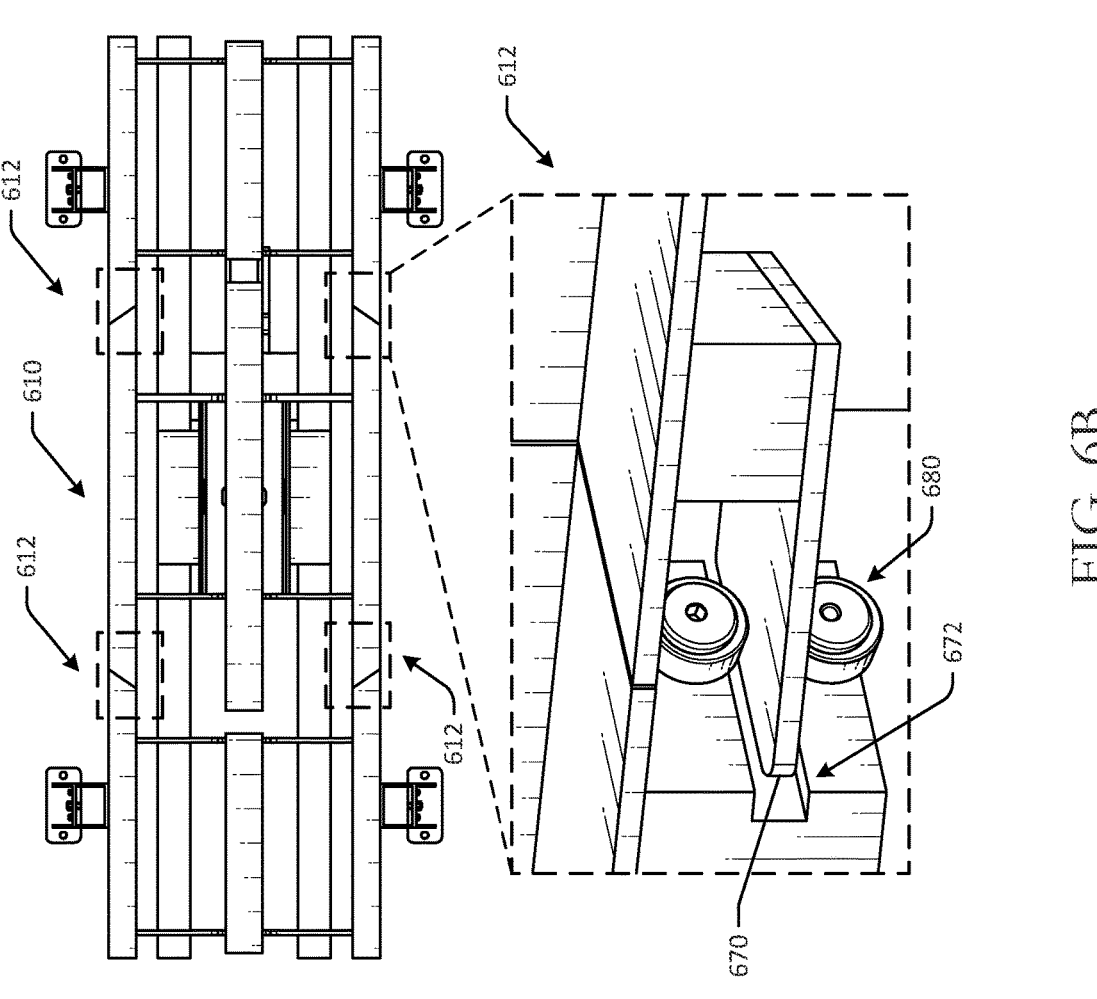

FIGS. 6A-6B are schematic illustrations of an automated shuttle reorientation system 600 in accordance with one or more embodiments of the disclosure. Other embodiments may include additional or fewer components. The illustrations of FIGS. 6A-6B are not to scale, and may not be illustrated to scale with respect to other figures. The automated shuttle reorientation area illustrated in FIGS. 6A-6B may be the same systems discussed with respect to FIGS. 1-5B.

In FIG. 6A, the automated shuttle reorientation system 600 is depicted in top view and cross-sectional view. In the top view, the automated shuttle reorientation system 600 includes a rotatable portion 610. The rotatable portion 610 may include rail segments having angled ends 612 that interface with corresponding angled ends along the adjacent portions of the track, so as to allow the rotatable portion 610 to rotate without leaving gaps between the rotatable portion 610 and the adjacent portions of the track.

As depicted in cross-sectional view along A-A in FIG. 6A, the automated shuttle reorientation system 600 may include one or more electromagnets or linear motors 620. The automated shuttle reorientation system 600 may include a servo gear motor 630 or other mechanism to drive rotation of the rotatable portion 610, such as one or more of a rotating solenoid, a belt-driven system, a rotary actuator, or another suitable device. The automated shuttle reorientation system 600 may include a belt drive 640 configured to impart motion to the rotatable portion 610, and one or more belts 650 or gears coupling the rotatable rail segments to the actuator (e.g., the servo gear motor 630, etc.). As depicted in close-up bottom perspective view, the servo gear motor 630 may be coupled to a belt-driven system to impart motion. For example, a belt may be used to drive rotational motion due to space constraints. One or more apertures 660 in gears or slew bearings and belt pulleys may be used to route cables for the rotating linear motor or electromagnet to avoid tangle.

In FIG. 6B, the automated shuttle reorientation system 600 is depicted with a close-up view of an interface between adjacent angled edges 612. The rotatable portion 610 may include a rotatable rail segment with an angle edge that is aligned with a corresponding angled edge of an adjacent fixed rail segment. The rotatable portion 610 may include a member 670 configured to slide along a groove 672 formed in the fixed rail segment to guide movement of the rotatable portion 610. In some embodiments, the member 670 may be configured to engage the groove 672 when the rotatable portion is in the first position. One or more guide wheels 680 may be included to guide movement into, through, and out of the groove 672.

The automated shuttle reorientation system 600 may therefore be disposed between a first portion of the track and a second portion of the track. The first portion may have a first rail segment having a first angled edge, and the second portion may have a second rail segment having a second angled edge. The rotatable portion may have a third rail segment having a third angled edge configured to interface with the first angled edge when the rotatable portion is in the first position, and with the second angled edge when the rotatable portion is in the second position. The first rail segment or the first portion of the track may have the groove 672.

Figure 7A:
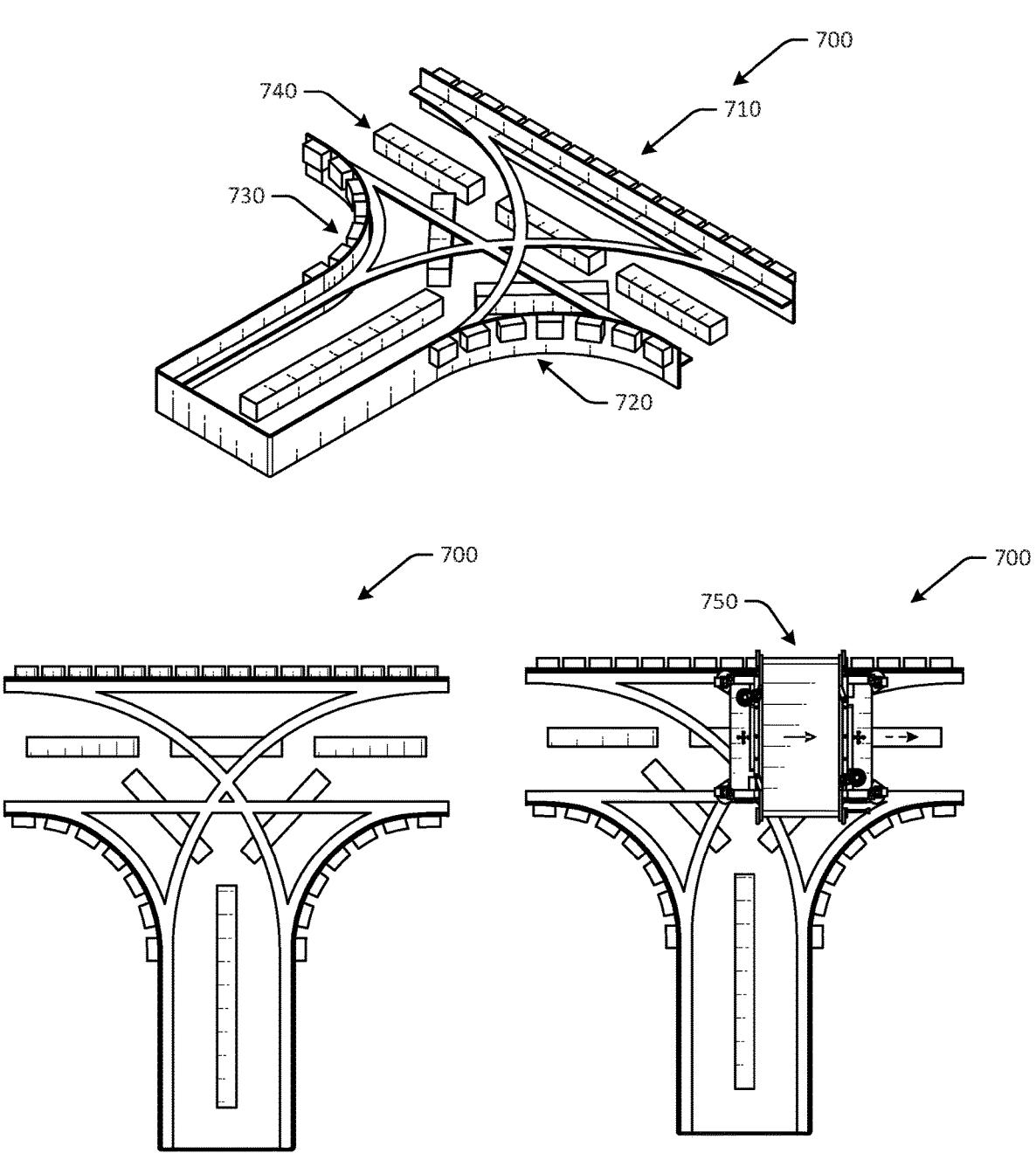
FIGS. 7A-7B are schematic illustrations of an automated shuttle reorientation system in accordance with one or more embodiments of the disclosure.
Figure 7B:
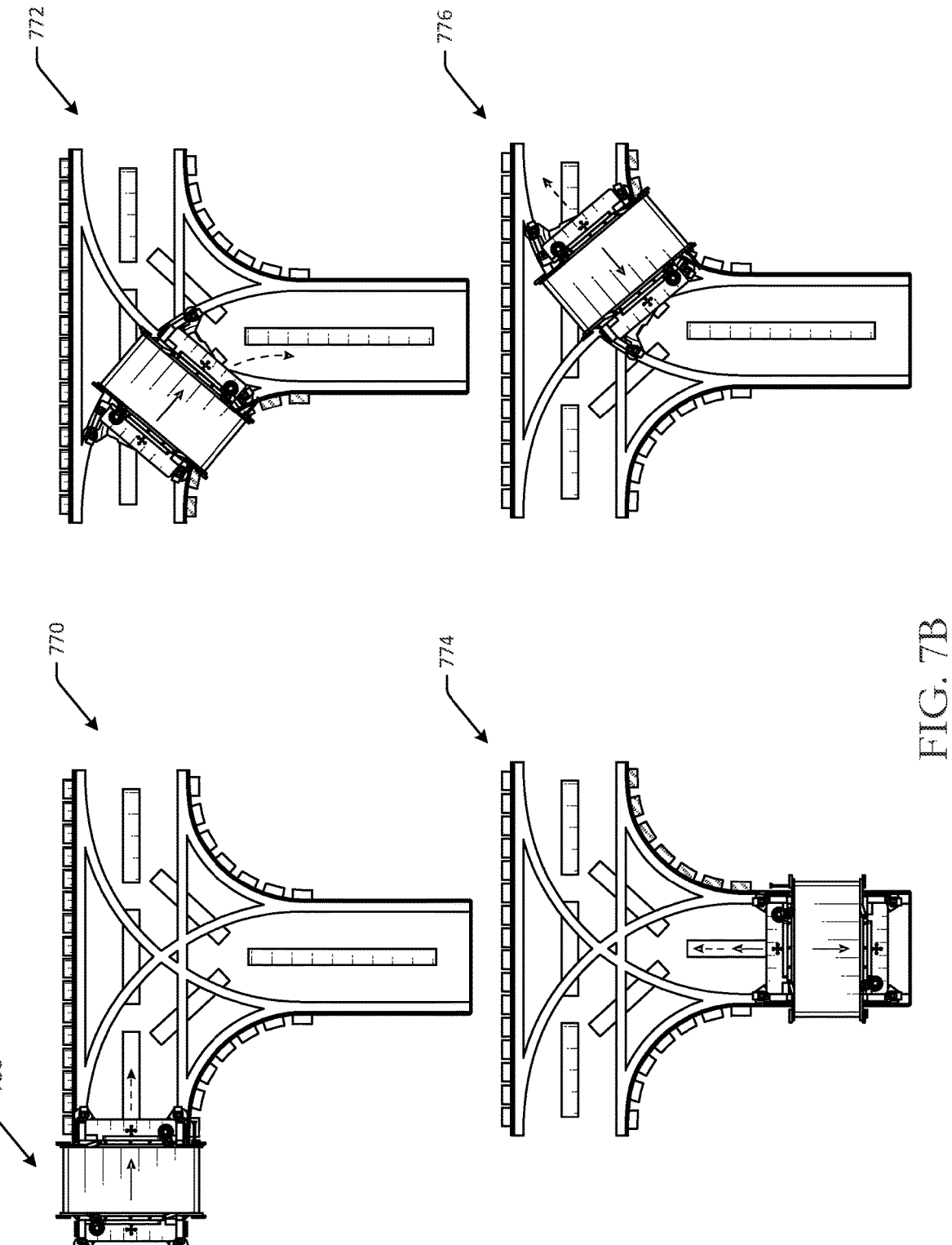

FIGS. 7A-7B are schematic illustrations of an automated shuttle reorientation system 700 in accordance with one or more embodiments of the disclosure. Other embodiments may include additional or fewer components. The illustrations of FIGS. 7A-7B are not to scale, and may not be illustrated to scale with respect to other figures. The automated shuttle reorientation system illustrated in FIGS. 7A-7B may be different from the systems discussed with respect to FIGS. 1-6B.

In FIG. 7A, an alternate shuttle reorientation system is depicted. The automated shuttle reorientation system 700 may use electromagnets or linear motors to guide shuttle movement and manage shuttle orientation when entering and exiting a track 710. The track 710 may include a linear path and a branched path, as depicted in FIG. 7A. The automated shuttle reorientation system 700 may include linear motors 740 to propel a shuttle 750 along the track.

The automated shuttle reorientation system 700 may include a first set of electromagnets 710 disposed along a side of the linear path, a second set of electromagnets 730 disposed along a first side of the branched path, and a third set of electromagnets 720 disposed along a second side of the branched path. The shuttle 750 may have one or more permanent magnets configured to interact with the first set of electromagnets 710, the second set of electromagnets 730, and the third set of electromagnets 720. For example, the shuttle 750 may have a first permanent magnet disposed along a lower surface to interact with the linear motors 740, a second permanent magnet disposed along a left-hand side surface to interact with the first set of electromagnets 710 and the third set of electromagnets 720, and a third permanent magnet disposed along a right-hand side surface to interact with the second set of electromagnets 730. In this manner, shuttle orientation can be managed by selective energizing of the different sets of electromagnets.

For example, in FIG. 7A, for the shuttle 750 to continue moving along the linear path, the first set of electromagnets 710 may be energized (while the second set of electromagnets 730 and the third set of electromagnets 720 are not energized) while the linear motors 740 propel the shuttle 750, such that the shuttle 750 bypasses the branched path and continues along the linear path.

In FIG. 7B, at a first instance 770, for the shuttle 750 to exit the linear path and enter the branched path, the second set of electromagnets 730 may be energized (while the first set of electromagnets 710 and the third set of electromagnets 720 are not energized) while the linear motors 740 propel the shuttle 750, such that the shuttle 750 is pulled onto the branched path and continues along the branched path. At a second instance 772, the shuttle 772 continues along the branched path. At a third instance 774 and fourth instance 776, for the shuttle 750 to return to the linear path from the branched path, the third set of electromagnets 720 may be energized (while the first set of electromagnets 710 and the second set of electromagnets 730 are not energized) while the linear motors 740 propel the shuttle 750, such that the shuttle 750 is pulled onto the linear path and continues along the linear path. In this manner, the shuttle orientation is maintained in a correct position when exiting and re-entering the linear path, instead of potentially reversing. Moreover, shuttle orientation may be reversed by selective activation of the different sets of electromagnets. Accordingly, in some embodiments, the shuttle 750 leaves the linear path and reenters the linear path having a reversed orientation.

Some embodiments may include a controller configured to cause the first set of electromagnets 710 to be energized to guide the shuttle 750 along the linear path, cause the second set of electromagnets 730 to be energized to guide the shuttle 750 from the linear path to the branched path, and cause the third set of electromagnets 720 to be energized to guide the shuttle 750 from the branched path to the linear path. The shuttle 750 may include one or more permanent magnets, such as a first permanent magnet disposed under the shuttle. The shuttle 750 may include a second permanent magnet on a first side of the shuttle, and a third permanent magnet on a second side of the shuttle. In other embodiments, instead of permanent magnets on one or more sides of the shuttle 750, the shuttle 750 may include one or more ferrous blocks, such as metal blocks, disposed on one or more sides of the shuttle 750. For example, a first ferrous block may be disposed on a first side of the shuttle 750, and a second ferrous block may be disposed on a second side of the shuttle 750. Any number of ferrous blocks may be included.

One or more operations of the methods, process flows, or use cases of FIGS. 1-7B may have been described above as being performed by a user device, or more specifically, by one or more program module(s), applications, or the like executing on a device. It should be appreciated, however, that any of the operations of the methods, process flows, or use cases of FIGS. 1-7B may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7B may be described in the context of the illustrative devices, it should be appreciated that such operations may be implemented in connection with numerous other device configurations.

The operations described and depicted in the illustrative methods, process flows, and use cases of FIGS. 1-7B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/ or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
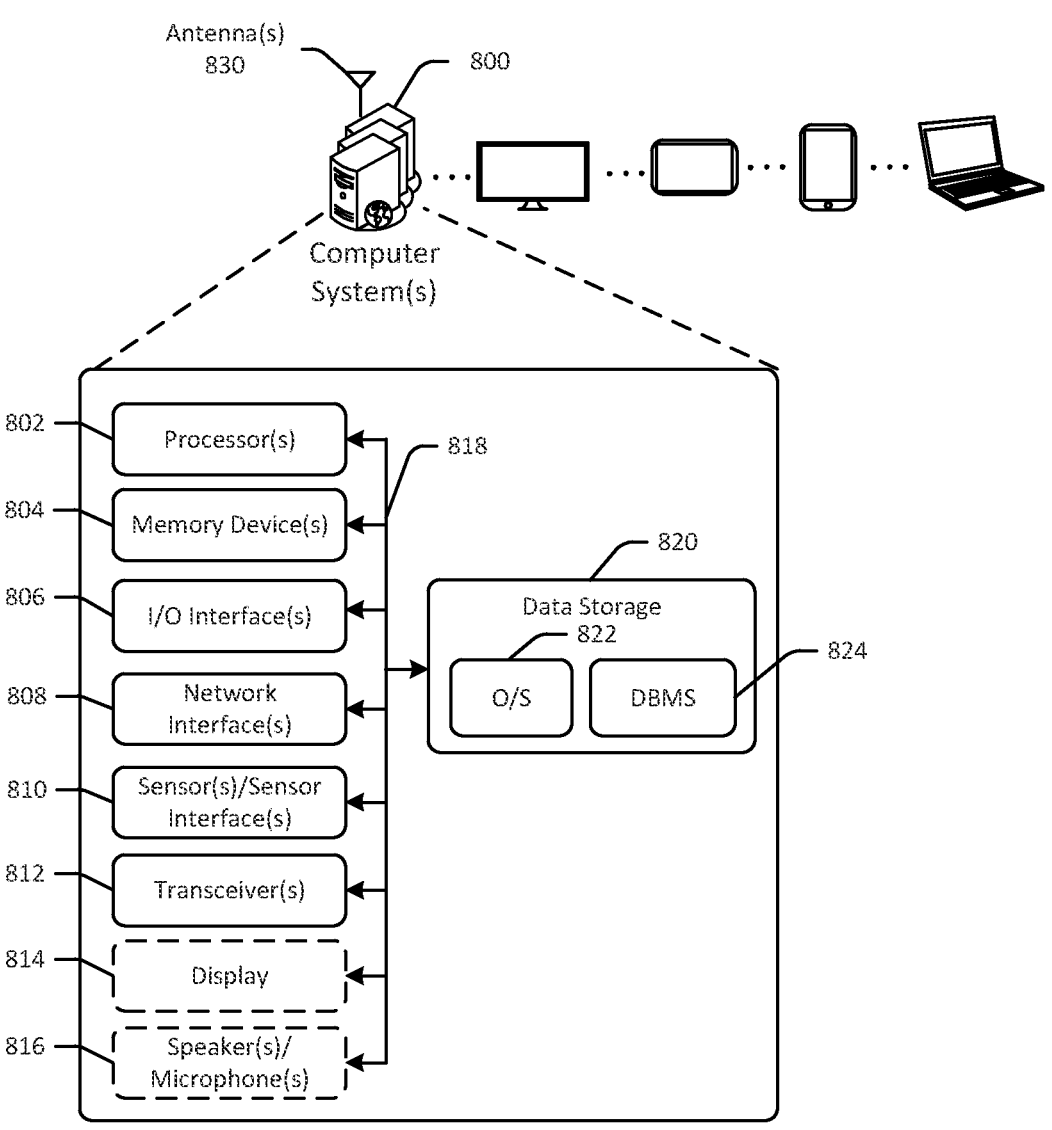
FIG. 8 schematically illustrates an example architecture of a computer system associated with a shuttle rail system in accordance with one or more embodiments of the disclosure.

FIG. 8 is a schematic block diagram of one or more illustrative computer system(s) 800 associated with a shuttle rail system in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the controller(s) of FIGS. 1-7B. For example, the computer system(s) 800 may be a controller and may control one or more aspects of the automated reorientation of sortation shuttles described in FIGS. 1-7B.

The computer system(s) 800 may be configured to communicate with one or more servers, user devices, or the like. The computer system(s) 800 may be configured to perform shuttle diagnostics, control reorientation systems, identify shuttles, direct shuttles, move shuttles, determine sensor feedback, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system (s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11 ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving-potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
a set of rails that form a track having a central axis, the set of rails comprising a first rail segment on a first side of the central axis and a second rail segment on a second side of the central axis;
a set of electromagnets disposed along the central axis of the track;
a shuttle configured to transport items from a first location to a second location using the set of rails, the shuttle comprising a first set of wheels and a first conveyor assembly having a central axis that is transverse to the central axis of the track; and
a rotatable track portion comprising a third rail segment having a first end, a second end, and an electromagnet, wherein the rotatable track portion is configured to rotate from a first position to a second position, and wherein the first end is adjacent to the first rail segment in the first position, and the second end is adjacent to the first rail segment in the second position, wherein the third rail segment comprises a member;
wherein the rotatable track portion is configured to rotate the shuttle from a first orientation to a second orientation, and wherein the first rail segment comprises a groove and one or more guide wheels configured to guide the member through the groove, and the member is configured to engage the groove when the rotatable portion is in the first position.

2. The system of claim 1, wherein the shuttle further comprises a permanent magnet, and wherein the electromagnet of the rotatable portion is configured to rotate from the first position to the second portion; and
wherein the shuttle is propelled via interaction between the electromagnet and the permanent magnet, and the electromagnet is configured to secure the shuttle in position during rotation of the rotatable portion.

3. The system of claim 1, wherein the first rail segment has a first angled edge, the second rail segment has a second angled edge, and the rotatable portion comprises a third rail segment having a third angled edge configured to interface with the first angled edge and the second angled edge.

4. The system of claim 1, wherein the rotatable portion is configured to rotate in both a clockwise direction and a counter-clockwise direction.

5. A system comprising:
a track comprising:
a first portion comprising a first rail segment;
a second portion comprising a second rail segment; and
a rotatable portion comprising a third rail segment having a first end and a second end, wherein the rotatable portion is configured to rotate from a first position to a second position, and wherein the first end is adjacent to the first portion of the track in the first position, and the first end is adjacent to the second portion of the track in the second position, wherein the third rail segment comprises a member;
wherein the first rail segment comprises a groove and one or more guide wheels configured to guide the member through the groove, and the member is configured to engage the groove when the rotatable portion is in the first position; and
a shuttle configured to move along the track, wherein the rotatable portion of the track is configured to rotate the shuttle from a first orientation to a second orientation.

6. The system of claim 5, wherein the shuttle comprises a permanent magnet, and wherein the rotatable portion further comprises:
an electromagnet configured to rotate from the first position to the second position;
wherein the shuttle is propelled via interaction between the electromagnet and the permanent magnet.

7. The system of claim 6, wherein the electromagnet is configured to secure the shuttle in position during rotation of the rotatable portion.

8. The system of claim 5, wherein the shuttle comprises a conveyor having a first central axis that is transverse to a second central axis of the track.

9. The system of claim 5, wherein the first rail segment has a first angled edge, the second rail segment has a second angled edge, and the third rail segment has a third angled edge configured to interface with the first angled edge when the rotatable portion is in the first position, and with the second angled edge when the rotatable portion is in the second position.

10. The system of claim 5, wherein the rotatable portion further comprises:
one or more of a rotating solenoid, a belt-driven system, or a rotary actuator.

11. The system of claim 5, wherein the rotatable portion is configured to rotate in both a clockwise direction and counter-clockwise direction.

12. The system of claim 5, wherein the rotatable portion is configured to rotate less than 360 degrees.

13. The system of claim 5, wherein the track further comprises a first support having a fixed position at the first portion, and a second support configured to rotate with the rotatable portion.

14. The system of claim 5, wherein the track is a closed loop track.

15. A system comprising:
a track having a linear path and a branched path, the track comprising a first rail segment, a second rail segment, and a third rail segment having a member, wherein the first rail segment comprises a groove and one or more guide wheels configured to guide the member through the groove, and the member is configured to engage the groove when the rotatable portion is in the first position;
a first set of electromagnets disposed along the linear path;

a second set of electromagnets disposed along a first side of the branched path;

a third set of electromagnets disposed along a second side of the branched path; and a shuttle comprising one or more permanent magnets configured to interact with the first set of electromagnets, the second set of electromagnets, and the third set of electromagnets.

16. The system of claim 15, further comprising:

a controller configured to:

cause the first set of electromagnets to be energized to guide the shuttle along the linear path;

cause the second set of electromagnets to be energized to guide the shuttle from the linear path to the branched path; and cause the third set of electromagnets to be energized to guide the shuttle from the branched path to the linear path.

17. The system of claim 16, wherein the shuttle leaves the linear path and reenters the linear path having a reversed orientation.

18. The system of claim 15, wherein the one or more permanent magnets comprises a permanent magnet disposed under the shuttle, and the shuttle further comprises a first ferrous block on a first side of the shuttle, and a second ferrous block on a second side of the shuttle.

* * * * *